United States Patent [19]
Wolf

[11] Patent Number: 5,771,276
[45] Date of Patent: Jun. 23, 1998

[54] VOICE TEMPLATES FOR INTERACTIVE VOICE MAIL AND VOICE RESPONSE SYSTEM

[75] Inventor: Richard J. Wolf, Crowley, Tex.

[73] Assignee: AST Research, Inc., Irvine, Calif.

[21] Appl. No.: 541,494

[22] Filed: Oct. 10, 1995

[51] Int. Cl.$^6$ .................................................... H04M 1/64
[52] U.S. Cl. .................................. 379/88; 379/67; 379/76
[58] Field of Search .................................. 379/67, 71, 72, 379/75, 76, 77, 88, 89; 395/2.67, 2.69, 2.78, 2.79, 2.8, 2.81, 2.85, 2.87, 702, 615, 326, 346, 348; 364/927, 130, 188, 191, 192, 193; 345/116; 704/258, 260, 269, 270, 271, 272, 276, 278

[56] References Cited

U.S. PATENT DOCUMENTS

| | | | |
|---|---|---|---|
| 4,785,408 | 11/1988 | Britton et al. | 364/513.5 |
| 4,922,520 | 5/1990 | Bernard et al. | 379/88 |
| 5,133,004 | 7/1992 | Heileman, Jr. et al. | 379/67 |
| 5,138,710 | 8/1992 | Kruesi et al. | 395/575 |
| 5,367,609 | 11/1994 | Hopper et al. | 395/2.87 |
| 5,488,650 | 1/1996 | Greco et al. | 379/67 |
| 5,493,606 | 2/1996 | Osder et al. | 379/67 |

FOREIGN PATENT DOCUMENTS

| | | | |
|---|---|---|---|
| 0605166 | 7/1994 | European Pat. Off. | 379/90 |

OTHER PUBLICATIONS

Richard Grehan, "Create Voice Response Applications Visually", BYTE Magazine, Nov. 1994, p. 44.

Steve Gladstone, "Stylus Innovations Visual Voice Development Tool Kit", Teleconnect, May 1994, p. 40.

*Primary Examiner*—Krista Zele
*Assistant Examiner*—Scott L. Weaver
*Attorney, Agent, or Firm*—Knobbe, Martens, Olson & Bear, LLP.

[57] ABSTRACT

Method and a system for a user-customizable interactive voice mail/voice response system are disclosed. In a preferred embodiment, an interactive voice mail/voice response ("IVR") system of the present invention enables a user to build and operate custom IVR functions using voice templates. An interactive voice mail/voice response ("IVR") system of the present invention enables a user to build and operate custom IVR menus. The system comprises a voice menu system that includes a plurality of menus, each comprising a plurality of script records implemented using voice templates made up of voice template elements of various types, the characteristics and behavior of which will be determined by their user-designated type and the characteristic of the voice response record with which they are associated. As a result, the voice elements, and in turn, the voice templates they comprise, dynamically exhibit a behavior that is appropriate to the current environment. When the contents of a voice template are to be played over the telephone line, the voice elements are played sequentially such that the result is perceived as a whole that represents the entire phrase or sentence as described by the text representation of the voice template.

30 Claims, 5 Drawing Sheets

VOICE TEMPLATES FOR INTERACTIVE VOICE MAIL AND VOICE RESPONSE SYSTEM

CROSS-REFERENCE TO RELATED APPLICATION

This application is a related to copending U.S. patent application Ser. No. 08/508,391, entitled SCRIPT-BASED INTERACTIVE VOICE MAIL AND VOICE RESPONSE SYSTEM, filed on Jul. 31, 1995, (now allowed U.S. Patent application Ser. No. 08/821,413) assigned to the assignee of the present application, and incorporated herein by reference as if reproduced in its entirety.

TECHNICAL FIELD

The invention relates generally to interactive voice response and voice mail systems and, more particularly, to a method of authoring such systems using voice templates.

BACKGROUND OF THE INVENTION

Various types of interactive voice response systems are well known in the art and typically comprise some means for prompting a caller who has dialed into the system to enter information and/or questions, often in response to a menu of voice prompts issued via the handset of the caller's telephone, wherein caller entries generally consist of DTMF key tones generated using the keypad of the caller's telephone. For example, the caller may be prompted to enter a "1" to enquire about an account balance, a "2" to speak to a customer service representative, or a "0" to speak to the operator. Assuming the caller enters a "1" in response to the first series of prompts, the caller may be prompted to enter his or her account number, at which point, the system will determine the balance of the account associated with the entered account number and announce same to the caller.

Voice mail systems are typically designated as those in which a caller can leave a message for an intended recipient who is not available to take the call at the time the call is received in the system. The caller's message is stored in some type of central memory device, in which all messages received for all extensions on the system are stored, and is designated as being for a single extension. Only the designated recipient can retrieve the messages left for his or her extension. The set of messages designated as being for a single recipient is commonly referred to as the recipient's "voice mailbox," although the messages may be stored throughout the memory device.

Currently available interactive voice response and voice mail systems range from high-end systems aimed at the large commercial consumers, which are typically complex systems custom designed to serve a variety of user-specified purposes, to lower-end systems aimed at the smaller commercial and individual consumers, which systems are typically less complex and capable of implementing fewer features. Moreover, although "lower end" systems have been developed which allow the user to customize certain voice mail and voice response features, such systems typically require a greater level of programming skill and knowledge than the average computer user is apt to possess.

Some existing voice response systems allow a user to record custom prompts, but do not support a text identification that directly relates to and identifies the contents of the response file. In many cases, the audio file comprising the recorded prompt is simply attached to the voice response menu and can only be identified by playing it to the speaker. Systems such as these make it difficult to manage and identify the recorded prompts unless the voice response menu is very simple. Moreover, in such systems, responses cannot be reused.

In other systems, responses can be identified and reused, but cannot be decomposed into constituent elements. As a result, these systems cannot offer as much reuse of prompts, thereby requiring the user to expend nearly the same amount of effort in building and maintaining such systems as would be the case if the prompts were not reusable. Additionally, management of the voice file inventory in such systems is likely to be difficult.

Therefore, what is needed is an interactive voice mail/voice response system that is simple and straightforward enough for the average user to install, customize and operate and that supports the reuse of entire prompts and selected portions thereof.

SUMMARY OF THE INVENTION

The present invention, accordingly, provides a method and a system for a user-customizable interactive voice mail/voice response system that overcome or reduce disadvantages and limitations associated with prior methods and systems.

In a preferred embodiment, an interactive voice mail/voice response ("IVR") system of the present invention enables a user to build and operate custom IVR menus. The system comprises a voice menu system that includes a plurality of menus, each comprising a plurality of script records implemented using voice templates and voice template elements.

As used herein, "voice templates" refers to a software program and associated data structures for enabling a user easily to build and maintain voice responses associated with an IVR system. Such templates may be decomposed "voice elements" by the user into of various types, the characteristics and behavior of which will be determined by their specific type, as designated by the user, and the characteristic of the voice response record with which they are associated. As a result, the voice elements, and in turn, the voice templates they comprise, to dynamically exhibit a behavior that is appropriate to the current environment.

In one aspect of the invention, voice element types fall into one of two general categories, including "recordings" and "properties." "Recordings" includes, for example, "stock recordings," which are typically provided by the manufacturer, VAR, or systems integrator and are professionally recorded responses that are useful to the general customer, "custom recordings," which are recorded by the user, and "text-to-speech," which comprise computer-generated audio. "Properties" includes element types that are related to specific properties of the record with which the template and its elements are associated and enable the voice response to vary dynamically with these characteristics. Examples include date and/or time of message recording, the number of messages contained in a mailbox and the contents of a database field.

When the contents of a voice template are to be played over the telephone line, the voice elements are played sequentially such that the result is perceived as a whole that represents the entire phrase or sentence as described by the text representation of the voice template.

A technical advantage achieved with the invention is that it provides a way to identify a complete voice response using a natural text representation of the response.

Another technical advantage achieved with the invention is that it enables a user to decompose a voice response into components that vary in characteristics and to reuse those components in composing other responses.

Yet another technical advantage achieved with the invention is that the voice response components vary dynamically as properties of the record with which the component is associated.

Still another technical advantage achieved with the invention is that it provides a testing/editing mechanism that automatically detects components for which there is no recording and prompts the user to create the components.

Still another technical advantage achieved with the invention is that it provides a testing/editing mechanism that automatically searches the system for response elements that are similar to the desired response, so that the user can use an existing response that is close to the desired response, if he so desires.

DESCRIPTION OF THE PREFERRED EMBODIMENTS

Figure 1A:
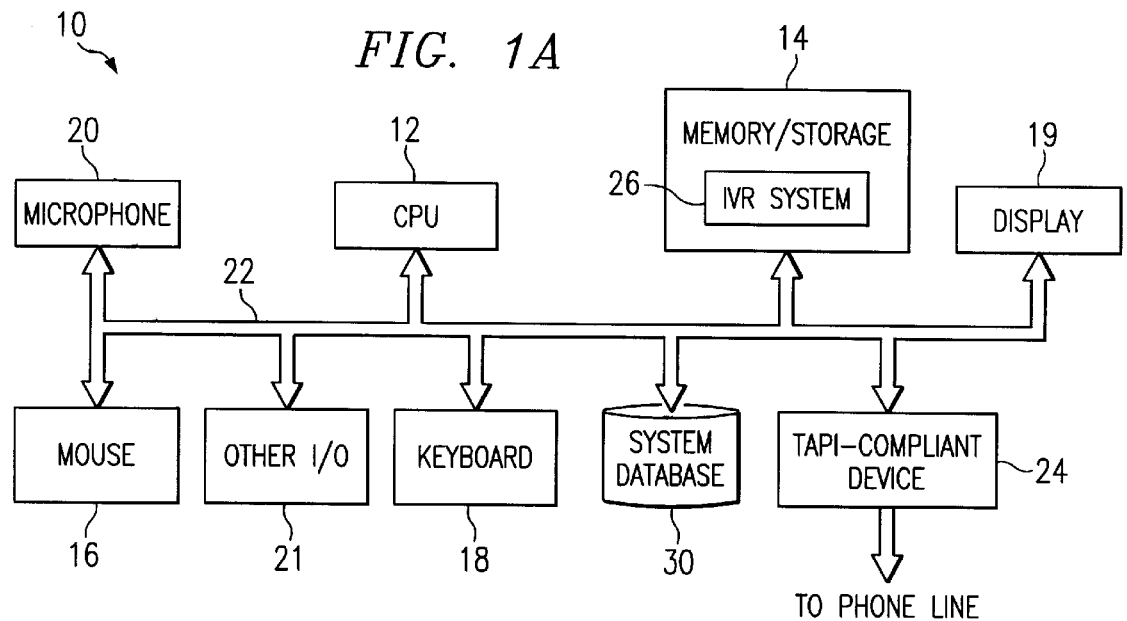
FIG. 1A is a system block diagram of a personal computer ("PC") embodying features of the present invention.

FIG. 1A illustrates a personal computer ("PC") 10 embodying features of the present invention. In particular, as shown in FIG. 1, the PC 10 comprises a central processing unit ("CPU") 12, memory and storage devices, collectively designated by a reference numeral 14, a mouse 16, a keyboard 18, a display 19, and a microphone 20 interconnected via one or more computer buses, shown in FIG. 1 as a bus 22. At least one Telephony Application Programming Interface ("TAPI") compliant device 24 is provided on the bus 22 for connecting the components of the PC 10 to a telephone line (not shown) and for providing the PC 10 with standard telephone capabilities. It will be recognized by those skilled in the art that "TAPI," which was jointly developed by Microsoft Corporation of Redmond, Washington, and Intel Corporation of Santa Clara, California, defines an interface between Microsoft Windows applications and telephone devices for providing a standard way to build telephone capabilities into Windows software. Alternatively, the device 24 may be a voice modem. As will be described, instructions for implementing an interactive voice mail/voice response ("IVR") system 26 are stored in the memory/storage device 14 for execution by the CPU 12. A system database 30 is also connected to the bus 22 for reasons to be described below.

Figure 1B:
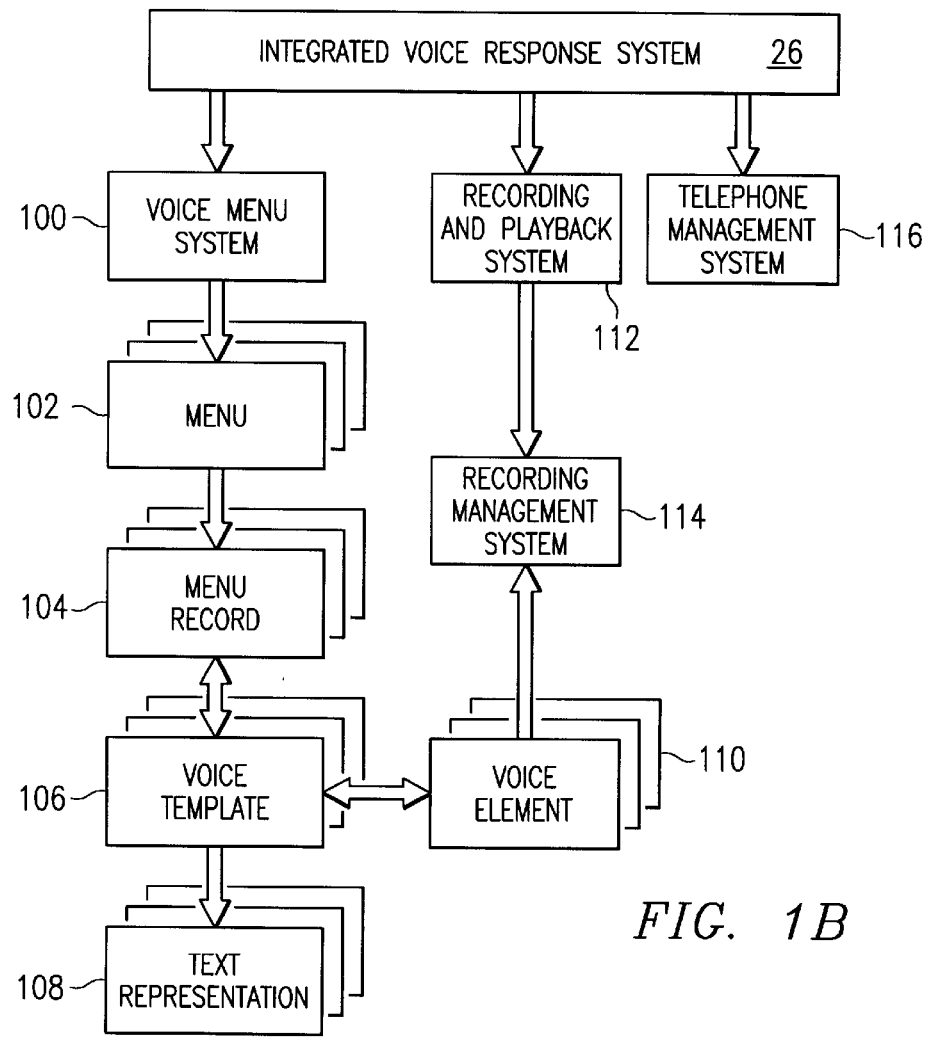
FIG. 1B is a conceptual block diagram of the interactive voice mail/voice response ("IVR") system of the present invention.

FIG. 1B is a conceptual block diagram of the IVR system 26 shown in FIG. 1A. In particular, the IVR system 26 comprises a voice menu system 100 that includes a plurality of menus 102. Each menu 102 includes a plurality of menu records 104. As will be described in greater detail below, the number of menus and records per menu is virtually unlimited and is established by a user. It should be noted, however, that the number of useful records is limited to the number of distinct DTMF tones that can be presented to the system, typically twelve, with a common telephone. In accordance with the features of the present invention, and as will be described in greater detail, each record 104 contains a number of voice templates 106, each of which in turn is represented by a text representation 108 and comprises a number of voice elements 110. As will become apparent, the manner in which each voice template 106 is broken down into voice elements 110 and the text representation 108 associated therewith will be primarily determined by the user.

As used herein, "voice templates" refers to a software program apparatus and associated data structures that enable a user easily to build and maintain voice responses associated with an IVR system, such as the IVR system 26. The method enables the user to construct text templates that serve as examples of the voice response desired. Each template 106 may be decomposed by the user into parts, or "voice elements," of various types so that construction of the various elements is more efficient and natural. As will be described below with reference to FIG. 4, the characteristics and behaviors of each voice template element will depend on both its specific type and the characteristics of the menu record 104 with which it is associated. This allows the voice elements 110, and in turn, the voice templates 106, to dynamically exhibit a behavior that is appropriate to the current environment.

Referring again to FIG. 1B, the IVR system 26 further comprises a recording and playback system 112 connected to a recording management system 114 for respectively enabling the user to record voice files and playback such files, as well as to hear recorded prompts and messages and leave messages, and for managing the recorded files and messages and allowing the recording and playback system 112 to access them. For example, if a given voice element requires a voice file, it will request the recording management system 114 to find the file based on its textual representation. If the file is located, the element requests the recording and playback system 112 to play the file. The IVR system 26 further comprises a telephone management system 116 for managing the device 24.

Figure 2:
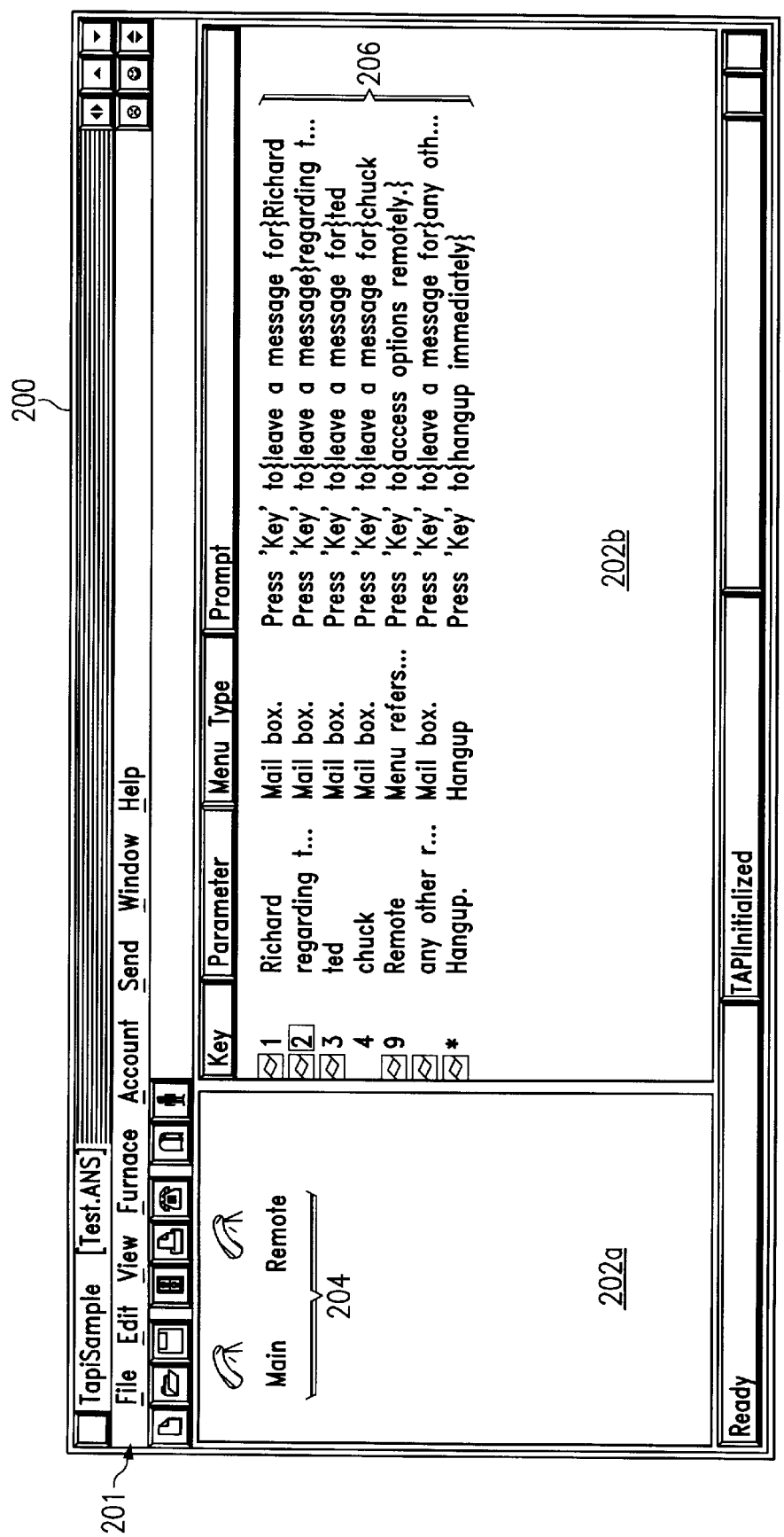
FIG. 2 illustrates a main screen of the user interface of the IVR system of the present invention.

In accordance with the features of the present invention, and as described in greater detail in U.S. Patent Application Ser. No. 08/508,391, entitled SCRIPT-BASED INTERACTIVE VOICE MAIL AND VOICE RESPONSE SYSTEM, filed on Jul. 31, 1995 (now allowed U.S. patent application Ser. No. 08/821,413) previously incorporated by reference in its entirety (hereinafter referred to as the "Related Application"), a user's use of the IVR system 26 is facilitated by the use of a plurality of graphical user interface ("GUI") screens and dialog boxes for display on the display 19. FIG. 2 illustrates a main screen 200 comprising a menu section 202a and a records section 202b. A plurality of menu icons 204, in this case, a "Main" icon and a "Remote" icon, are displayed in the menu section 202a. Upon selection of one of the menu icons 204 displayed in the menu portion 202a, a corresponding menu, or script, for the selected menu is displayed in the records section 202b. As shown in FIG. 2, the Main icon has been selected, resulting in the display in the records section 202b of the script 206. Each line of the displayed script 206 comprises an individual menu, or script, record.

As described in the Related Application, using the IVR system 26, the user is able to create, modify, and delete entire menus, such as Main or Remote, as well as one or more records within a menu. As will be recognized, a user can create as many different menus and corresponding scripts as he desires. It should be noted that, as used herein, "menu" and "script" may be used interchangeably to refer to a set of individual records.

As also described in the Related Application, and therefore not further described in detail herein, to create a new menu, and subsequently individual script records for the menu, the user accesses, through a series of appropriate menu picks, a number of dialog boxes; namely, a "Menu Properties" dialog box for use in creating a new menu, a "Mailbox Properties" dialog box for creating a Mailbox record that enables a caller to record a message and then deposits the recorded message in the corresponding mailbox, a "Menu Reference Properties" dialog box for creating a Menu Reference record that enables a caller to activate, or access, a second menu from a first menu, a "Read Mailbox Properties" dialog box for creating a Read Mailbox record that enables a caller to read messages previously deposited in his or her mailbox, and a "Hangup Properties" dialog box for creating a Hangup record to terminate the call. It should be recognized that any number of different types of records having various different properties may be implemented using the system 26.

Figure 3:
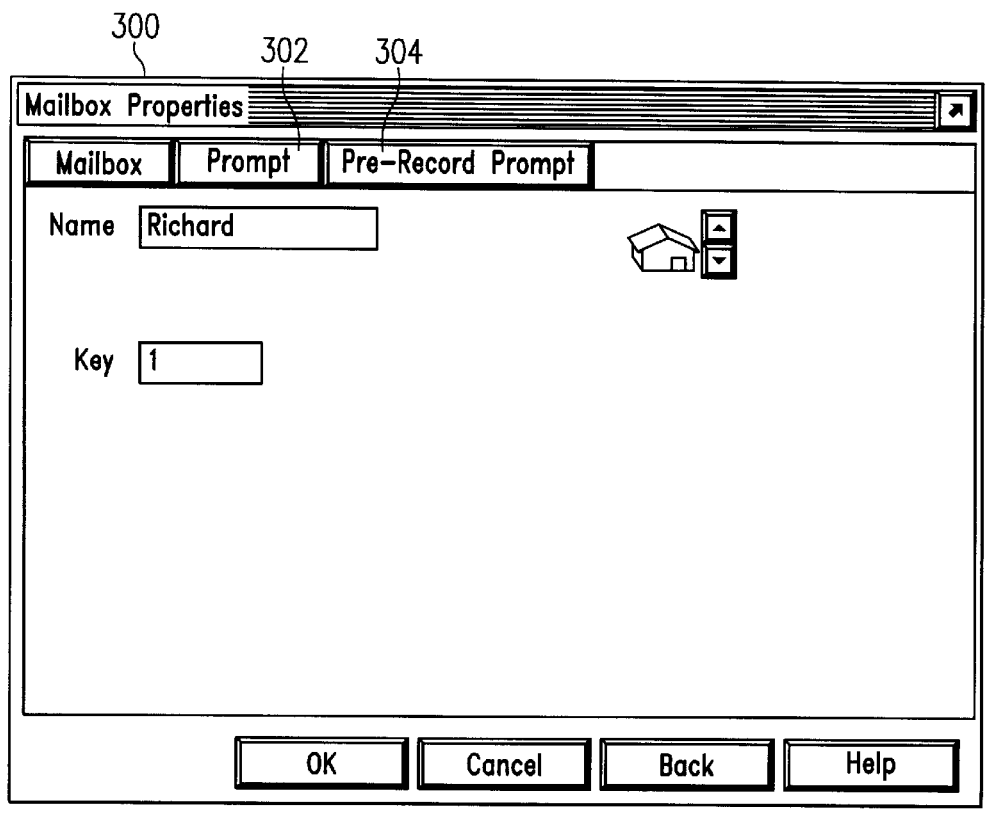
FIG. 3 illustrates a Mailbox page of a Mailbox Properties dialog box of the user interface of the IVR system of the present invention for creating and modifying Mailbox records.

Selection of the Mailbox menu pick from the script record type menu results in the display of a Mailbox Properties dialog box, for use in creating a mailbox record. As illustrated in FIG. 3, selection of a "Mailbox" tab 300 of the Mailbox Properties dialog box results in the display of a Mailbox page, which enables the user to enter the name of the mailbox, in this case "Richard," a DTMF key to be associated with the mailbox, in this case, "1," for accessing the mailbox from the menu, and also an icon for representing the record, if desired.

Figure 4:
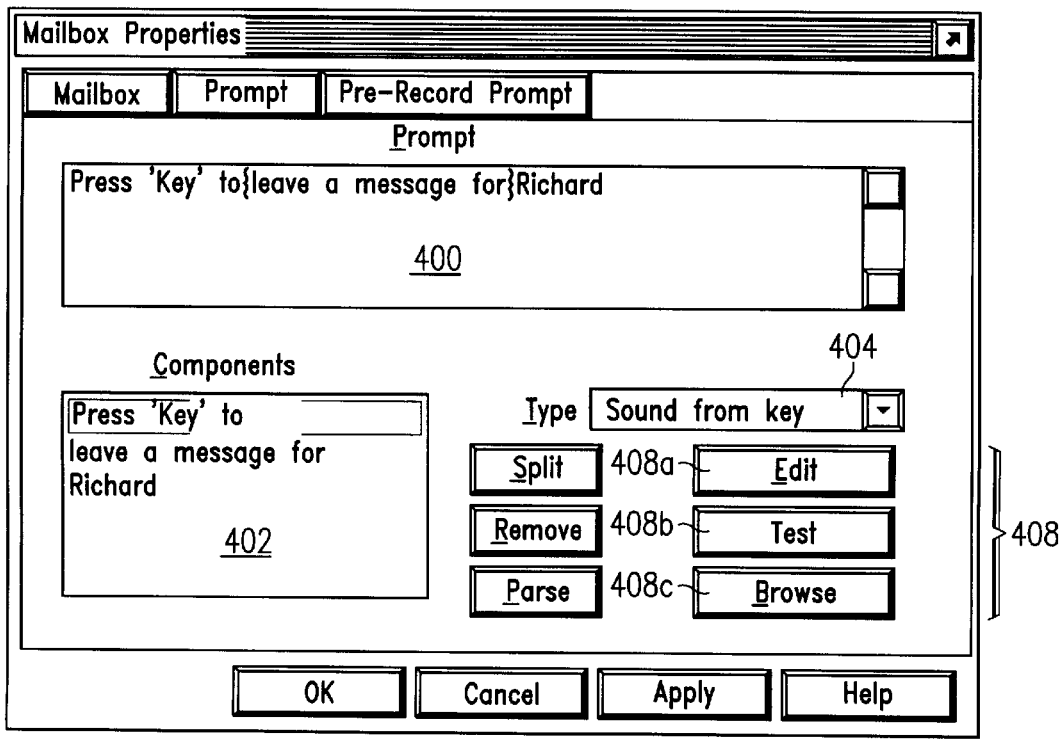
FIG. 4 illustrates a Prompt page of the Mailbox Properties dialog box shown in FIG. 3 for creating and modifying voice templates.

As illustrated in FIG. 4, selection of a "Prompt" tab 302 of the Mailbox Properties dialog box results in the display of a Prompt page for enabling the user to record a prompt to be played in connection with the particular record. In this case, an appropriate prompt might be "Press 1 to leave a message for Richard." Although not shown, selection of a "Prerecord prompt" tab 304 results in the display of a Prerecord prompt page similar to the Prompt page (FIG. 4) for enabling the user to record a prompt to be played after the record is selected by the remote caller's pressing the appropriate DTMF key, as designated on the Mailbox page (FIG. 3), and just before the incoming message is recorded. An appropriate prerecord prompt might be "At the sound of the tone, please leave a message for Richard."

Referring again to FIG. 2, it will be recognized that, for records created using the Mailbox Properties dialog box described above, the "Name" and "Key" entered on the Mailbox page (FIG. 3) will be respectively displayed as the "Parameter" and "Key" components of the associated record, the prompt entered on the Prompt page (FIG. 4) will be displayed as the "Prompt" component of the record, and "Mailbox" will be displayed as the "Menu type" component of the record.

Although the operation of the present invention is described below with reference to a mailbox record, it will be recognized that other types of records, including, but not limited to, those described in the Related Application, may be created in a similar fashion using the concept of voice templates as described below.

Referring again to FIG. 4, creation of a voice template for a mailbox record will now be described in detail. For purposes that will be described, the Prompt page comprises a prompt box 400 in which the prompt, or template, is typed by the user; a components box 402 in which template elements, as selected by the user, are listed; a type box 404 comprising a drop-down menu for enabling the user to select predefined characteristics for each element in the components box 402; and a plurality of buttons 408 including, in particular, a Split button 408a, a Test button 408b, and a Browse button 408c.

Figure 5:
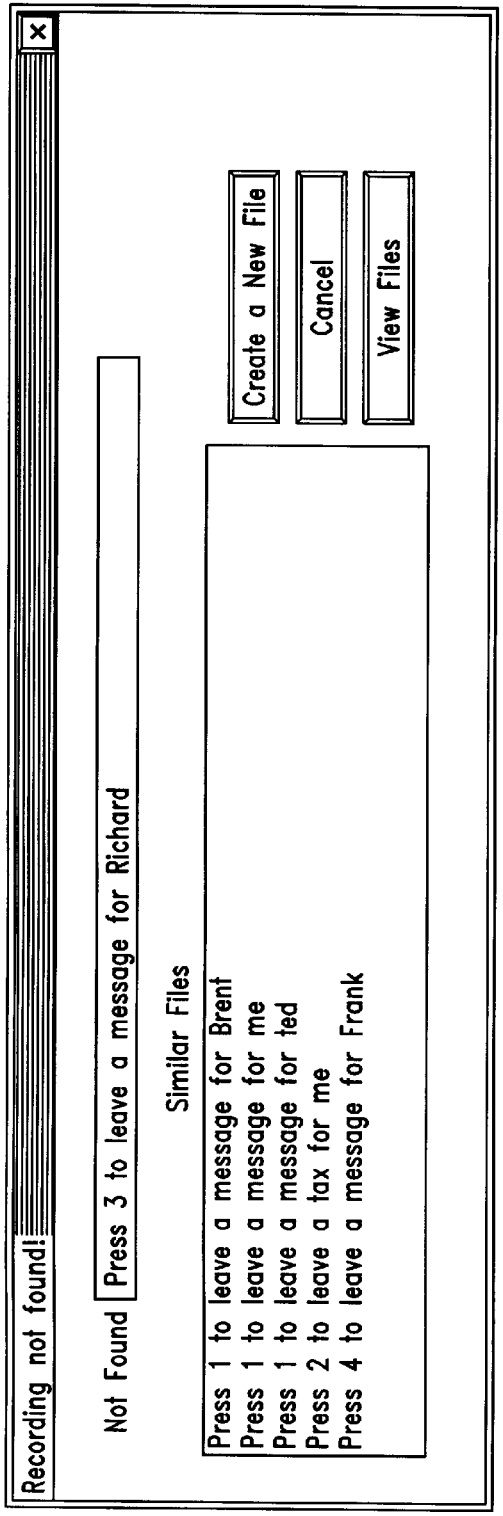
FIG. 5 illustrates a Browse dialog for selecting from among preexisting voice templates.

Once the user has completed filling in the necessary information on the Mailbox page (FIG. 3) for creating a new mailbox record, the user will bring up the Prompt page (FIG. 4) by selecting the Prompt tab 302 and type the desired prompt for the current mailbox as designated in the Mailbox page, in this case "Richard," in the prompt box 400. For example, as previously mentioned, an appropriate initial prompt might be "Press 1 to leave a message for Richard." Once the user has typed a prompt in the prompt box 400, the user can "test" the template by clicking on a Test button 402. Selection of the Test button 402 results in a search of the text representations of all of the prerecorded prompts stored in the database 30 to locate one or more prompts that are identical or similar to the prompt typed in the prompt box 400. Once the search is completed, a list of identical and/or similar prompts is displayed to the user via a "Browse" dialog similar to that shown in FIG. 5. At that point, the user may elect to use one of the prompts displayed in the Browse dialog by selecting the appropriate prompt, or to create a new prompt. Typically, a user will opt for the latter course of action if no identical or sufficiently similar prompts are located, as is the case in FIG. 5. It should be noted that the ability of the system 26 to search for a prerecorded prompt that matches the prompt entered in the area 400 illustrates the importance of ensuring that the text reference 108 of each template corresponds to the audio content of the prompt.

After typing the prompt, the user may realize that portions of the prompt may be reused in other prompts. For example, it is likely that something similar to "Press '#' to," where '#' represents a number associated with a DTMF key of the caller's telephone, will be used in nearly every menu prompt requiring a caller to enter a selection using the DTMF keys of the caller's telephone. In this case, the user would simply select the "Press 1 to" portion of the prompt, for example using the mouse 16, and then click on the Split button 408a, which splits the template into two pieces, rendered in the prompt area 400 as "Press 1 to {leave a message for Richard}". At that point, the user may further realize that the name associated with the mailbox, in this case "Richard," will change depending on the mailbox with which the template is associated; therefore, by splitting "Richard" from "leave a message for" in the manner described above, the second element can be made more generic, and hence, more widely applicable to other prompts.

At this point, the template shown in the prompt box 400 comprises three elements, which are "Press 1 to," "leave a message for" and "Richard," as shown individually in the components box 402. Once the elements of the template have been identified in the above-described manner, the user must select a "Type" for each element shown in the components box 402. The different available types include "Stock Recording," which results in a stock, or professional recording, if one is available, being used for the element, "Custom Recording," which results in the user's being prompted to record a custom recording for the element, typically if a stock recording is not available, "Sound from Key," which uses the name or number of the Key designated on the Mailbox page (FIG. 3) for the element, both in the textual representation and the associated audio file, "Mailbox Name," which uses the Mailbox Name from the Mailbox page (FIG. 3) for the element, both in the textual representation and the associated audio file, "Text to Speech," which generates an artificial rendition of the element, and "Number of Options," for determining the number of records in the current script and substituting that number for the element, both in the textual representation and in the audio file.

For example, referring to FIG. 4, the first element shown in the components box 402 ("Press 'key' to") is a "Sound from Key" type, the second element shown in the components box 402 ("leave a message for") may be a "Stock Recording" type, if a stock recording similar or identical to that element is available, a "Custom Recording" type, if the subscriber would like to record his or her own recording, or a "Text to Speech" type, if the subscriber would like to have the audio for the element generated by the PC 10, and the third element shown in the components box 402 ("Richard") is most likely a "Mailbox Name" type.

There are two key concepts inherent in the foregoing. First, the element types that are available are a function of the prompt type, the record type, and the menu. For example, only "Mailbox" and "Read Mailbox" records have a "Mailbox Name" type. When editing a Message Header Prompt type of record, the user will be presented with element types such as "Message Number," "Message Date," "Message Time," "Message Duration," and the like. When a new record type is added, the unique element types that are supported are automatically made available through the existing dialogs. Second, the elements are dynamic in that they obtain their value at the time required so they change automatically. For example, if the user changes the mailbox name for a particular record, the "Mailbox Name" element will also change.

It should be noted that all user-recorded audio prompts and greetings described herein are recorded using the microphone 20. The prompt or greeting, or portion thereof will be stored as a sound file, most likely, a WAVE format file, associated with and identified by the corresponding text reference.

Figure 7:
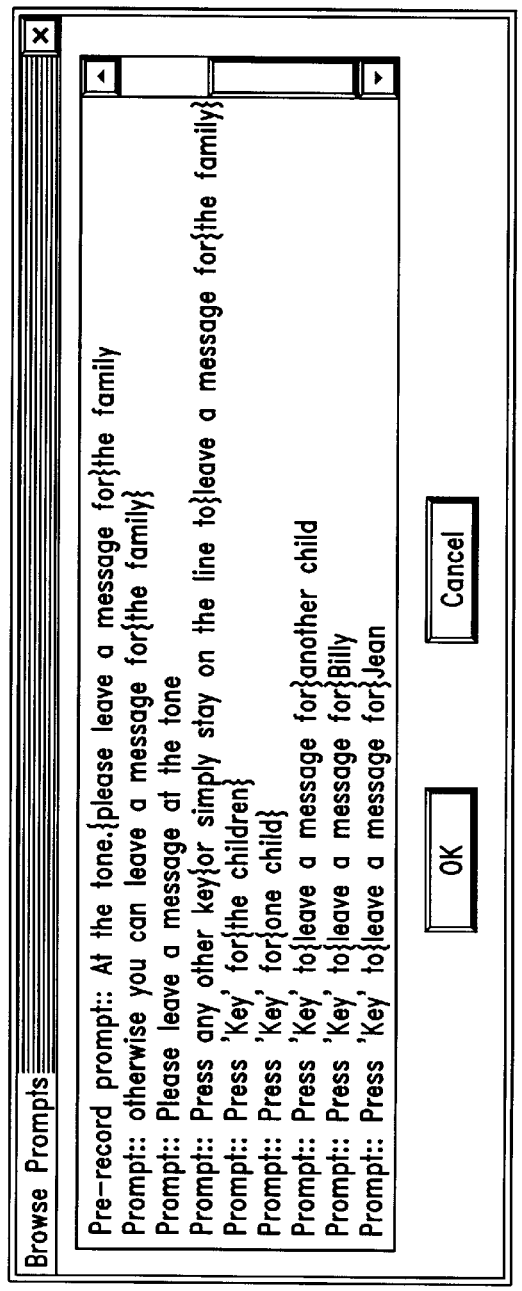
FIG. 7 illustrates a Browse Prompts dialog for browsing available prompts.
Figure 6:
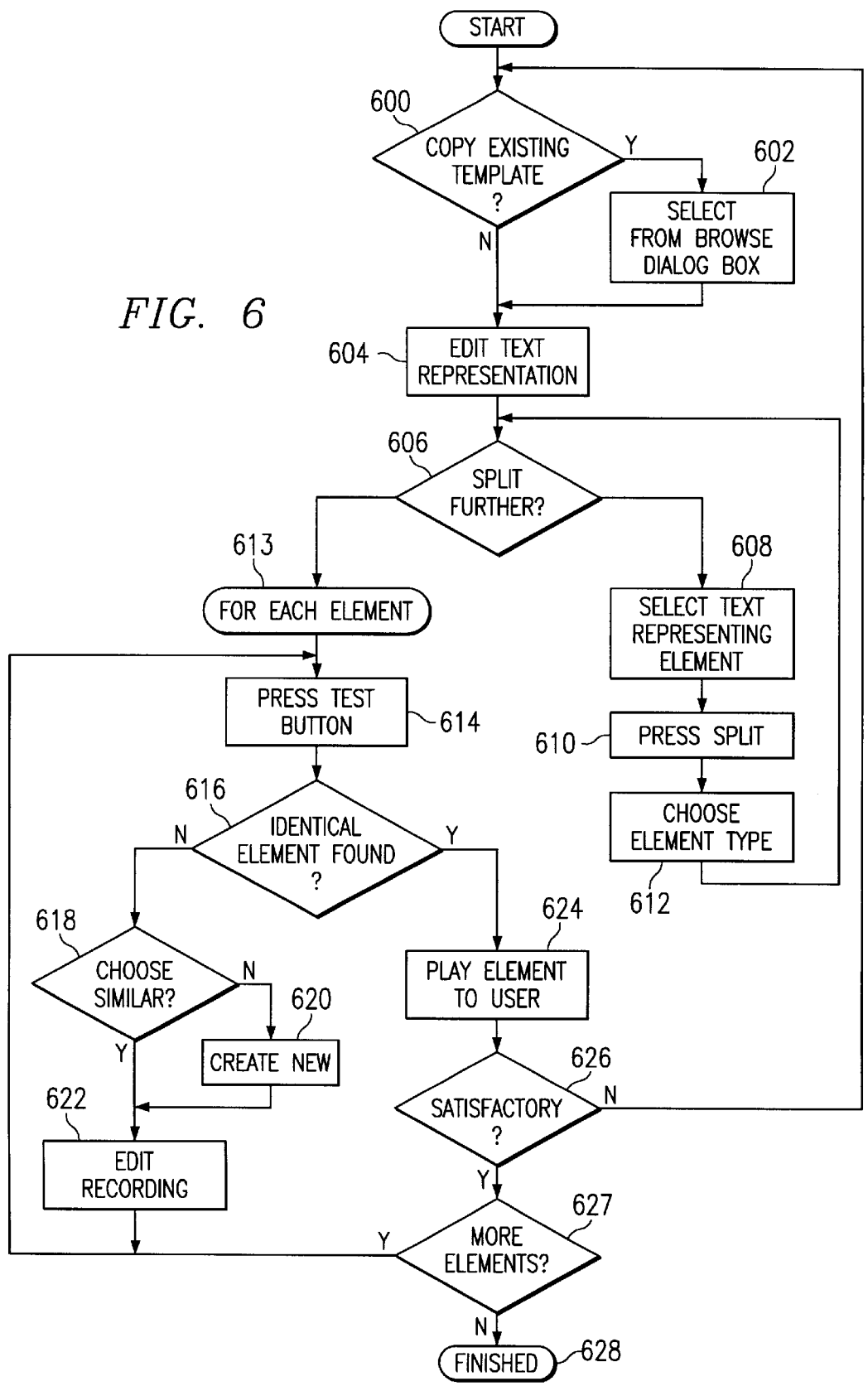
FIG. 6 is a control flow diagram of the IVR system of the present invention.

FIG. 6 illustrates a method of operation of the IVR system 26. In step 600, a determination is made whether an existing template is to be copied. If so, execution proceeds to step 602, in which the user brings up a Browse Prompts dialog, as shown in FIG. 7, by pressing the Browse button 408c (FIG. 4) and selects an existing template therefrom. Execution then proceeds to step 604.

Similarly, if in step 600 it is determined that a new template is to be created, execution proceeds directly to step 604. In step 604, the user edits the text representation by editing the selected template, if necessary, or entering the text of the new template. Execution then proceeds to step 606, in which a determination is made whether the template is to be split, as described with reference to FIG. 4. If so, execution proceeds to step 608, in which the user selects the text representing the element to be split, then to step 610, in which the user presses the SPLIT button to split the element, and finally to step 612, in which the user selects the element type, as described with reference to FIG. 4. Execution then returns to step 606 and the process is repeated until a determination is made at step 606 that no more splits are desired, at which point, execution proceeds to step 613.

Step 613 indicates the beginning of the testing/implementation routine that is implemented for each elements of the current template. In step 614, the user tests the element by pressing the TEST button 408b (FIG. 4). In step 616, a determination is made whether a file identical to the element tested in step 614 is located in the database 30. If not, execution proceeds to step 618, in which a list of files similar to the element, if any, are displayed in a Browse dialog (FIG. 5) and a determination is made whether the user would like to select from the displayed list. If not, execution proceeds to step 620, in which the user records a new file for the element, and then to step 622, in which the user may edit the recording. Similarly, if in step 618, the user selects a similar file from the displayed list, execution proceeds directly to step 622. From step 622, execution returns to step 614.

If in step 616 it is determined that an identical file is located for the element, execution proceeds to step 624, in which the element is played to the speaker. In step 626, a determination is made whether the template is satisfactory. If so, execution proceeds to step 627, in which a determination is made whether there are more elements; otherwise, execution returns to step 600.

If in step 627, it is determined that there are more elements, execution returns to step 614; otherwise, terminates in step 628.

In this manner, the user can create and reuse portions of or complete voice templates in creating multiple prompts and/or greetings to be played to a caller in an IVR system. Moreover, the availability of the system of the present invention to search for identical or similar prompts significantly reduces the amount of time and effort required to build an effective menu of records.

It is understood that the present invention can take many forms and embodiments, the embodiments shown herein are intended to illustrate rather than limit, the invention, it being understood that variations may be made without departing from the spirit of the scope of the invention. For example, the concept of using voice templates could be implemented in many different operating environments, including, but not limited to, the Macintosh, UNIX, XWindows and MOTIF environments. In addition, the device 24 could be implemented using the Novel TSAPI interface or a specific voice processing board.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of implementing an interactive voice mail/voice response (IVR) system on a personal computer ("PC"), the method comprising the steps of:

creating a script for implementing a user-specified set of IVR functions, said script comprising a plurality of records each having a template associated therewith;

for each of said records, automatically splitting a text representation of said associated template into template elements and searching a database for said template elements;

for each of said template elements, assigning a type to said template element, said type defining characteristics of said template element; and for each of said template elements, storing a text representation of and an audio file associated with said template element in said database.

2. The method of claim 1 wherein each of said template elements is a stock recording type, a custom recording type, a sound from key type, a name type, a text to speech type, or a number of items type.

3. The method of claim 2 further comprising recording a custom recording for each custom recording type template element.

4. The method of claim 1 further comprising testing each of said template elements.

5. The method of claim 4 further comprising, responsive to said testing, for each of said tested template elements:

displaying a list of template elements similar to said tested template element; and responsive to user selection of one of said displayed template elements, substituting said selected template element for said tested template element in said script.

6. The method of claim 4 further comprising, responsive to said testing, for each of said template elements, playing an audio file associated with said template element to a user.

7. The method of claim 4 wherein said testing is performed by user-selection of a graphical display element ("GDE") presented on a display of said PC.

8. The method of claim 1 further comprising, responsive to user selection of a graphical display element ("GDE") presented on a display of said PC, displaying a list of text representations of template elements stored in said database.

9. A method of implementing an interactive voice mail/voice response (IVR) system on a personal computer ("PC") connected to a telephone line, the method comprising the steps of:

creating a script for implementing a user-specified set of IVR functions, said script comprising a plurality of records each having a template associated therewith;

for each of said records, automatically splitting a text representation of said associated template into template elements and searching a database to find said template elements;

for each of said template elements, assigning a type to said template element, said type defining characteristics of said template element; and for each of said template elements, storing a text representation of and an audio file associated with said template element in said database;

testing each of said template elements; and responsive to said testing, for each of said tested template elements, displaying a list of template elements similar to said tested template element and responsive to user selection of one of said displayed template elements, substituting said selected template element for said tested template element in said script.

10. The method of claim 9 wherein each of said template elements is a stock recording type, a custom recording type, a sound from key type, a name type, a text to speech type, or a number of items type.

11. The method of claim 10 further comprising recording a custom recording for each custom recording type template element.

12. The method of claim 9 further comprising, responsive to said testing, for each of said template elements, playing an audio file associated with said template element to a user.

13. The method of claim 9 wherein said testing is performed by user-selection of a graphical display element ("GDE") presented on a display of said PC.

14. The method of claim 9 further comprising, responsive to user selection of a graphical display element ("GDE") presented on a display of said PC, displaying a list of text representations of template elements stored in said database.

15. An apparatus for implementing an interactive voice mail/voice response (IVR) system on a personal computer ("PC"), the apparatus comprising:

means for creating a script for implementing a user-specified set of IVR functions, said script comprising a plurality of records each having a template associated therewith;

means for automatically splitting a text representation of said associated template of each of said records into template elements and searching a database to find said template elements;

means for assigning a type to each of said template elements, said type defining characteristics of said template element; and means for storing a text representation of and an audio file associated with each of said template elements in said database.

16. The apparatus of claim 15 wherein each of said template elements is a stock recording type, a custom recording type, a sound from key type, a name type, a text to speech type, or a number of items type.

17. The apparatus of claim 16 further comprising means for recording a custom recording for each custom recording type template element.

18. The apparatus of claim 15 further comprising means for initiating testing each of said template elements.

19. The apparatus of claim 18 further comprising means responsive to said testing, for each of said tested template elements, for displaying a list of template elements similar to said tested template element and, responsive to user selection of one of said displayed template elements, substituting said selected template element for said tested template element in said script.

20. The apparatus of claim 18 further comprising means responsive to said testing, for each of said template elements, for playing an audio file associated with said template element to a user.

21. The apparatus of claim 18 wherein said means for initiating testing comprises a graphical display element ("GDE") presented on a display of said PC.

22. The apparatus of claim 15 further comprising, responsive to user selection of a graphical display element ("GDE") presented on a display of said PC, means for displaying a list of text representations of template elements stored in said database.

23. A computer program for implementing an interactive voice mail/voice response (IVR) system, the computer program being stored in a computer-readable medium for execution by a personal computer ("PC"), the computer program comprising:

instructions responsive to input from a user to create a script for implementing a user-specified set of IVR functions, said script comprising a plurality of records each having a template associated therewith;

instructions to automatically split a text representation of said associated template of each of said records into template elements and search a database for said template elements;

instructions for enabling a user to assign a type to each of said template elements, said type defining characteristics of said template element; and instructions responsive to input from a user to store a text representation of and an audio file associated with each of said template elements in said database.

24. The computer program of claim 23 wherein each of said template elements is a stock recording type, a custom recording type, a sound from key type, a name type, a text to speech type, or a number of items type.

25. The computer program of claim 24 further comprising instructions for recording a custom recording for each custom recording type template element.

26. The computer program of claim 23 further comprising instructions for initiating testing each of said template elements.

27. The computer program of claim 26 further comprising instructions for displaying a list of template elements similar to said tested template element and, responsive to user selection of one of said displayed template elements, substituting said selected template element for said tested template element in said script.

28. The computer program of claim 26 further comprising instructions for playing an audio file associated with said tested template element to a user.

29. The computer program of claim 26 further comprising instructions for presenting a graphical display element ("GDE") on a display of said PC, wherein selection of said GDE initiates said testing.

30. The computer program of claim 23 further comprising instructions for displaying a list of text representations of template elements stored in said database responsive to user selection of a graphical display element ("GDE") presented on a display of said PC.

* * * * *